(12) United States Patent
Nochi et al.

(10) Patent No.: US 8,815,194 B2
(45) Date of Patent: Aug. 26, 2014

(54) NOX REMOVAL CATALYST FOR HIGH-TEMPERATURE FLUE GAS, MANUFACTURING METHOD THEREOF, AND NOX REMOVAL METHOD FOR HIGH-TEMPERATURE FLUE GAS

(75) Inventors: Katsumi Nochi, Tokyo (JP); Toshinobu Yasutake, Tokyo (JP); Masanao Yonemura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 381 days.

(21) Appl. No.: 13/058,046

(22) PCT Filed: Oct. 6, 2009

(86) PCT No.: PCT/JP2009/067414
§ 371 (c)(1),
(2), (4) Date: Feb. 8, 2011

(87) PCT Pub. No.: WO2011/042953
PCT Pub. Date: Apr. 14, 2011

(65) Prior Publication Data
US 2011/0236283 A1    Sep. 29, 2011

(51) Int. Cl.
*B01D 53/56* (2006.01)
*B01D 53/86* (2006.01)
*B01J 8/00* (2006.01)
*C01B 21/00* (2006.01)
*B01J 23/00* (2006.01)
*B01J 23/10* (2006.01)
*B01J 21/00* (2006.01)

(52) U.S. Cl.
USPC ........ 423/239.1; 502/309; 502/350; 502/242; 502/254

(58) Field of Classification Search
USPC ......... 502/242, 254, 305, 309, 350, 308, 349; 423/239.1
See application file for complete search history.

(56) References Cited

U.S. PATENT DOCUMENTS

| | | | |
|---|---|---|---|
| 4,085,193 A | 4/1978 | Nakajima et al. | |
| 4,851,381 A | 7/1989 | Hums | |
| 4,891,348 A * | 1/1990 | Imanari et al. | 502/309 |
| 4,929,586 A * | 5/1990 | Hegedus et al. | 502/217 |
| 2006/0083671 A1* | 4/2006 | Obayashi et al. | 423/239.1 |

FOREIGN PATENT DOCUMENTS

| | | | |
|---|---|---|---|
| CN | 1524014 A | 8/2004 | |
| CN | 1642636 A | 7/2005 | |
| CN | 101534931 A | 9/2009 | |
| EP | 0 214 085 A1 | 3/1987 | |
| EP | 0 415 145 A1 | 3/1991 | |
| EP | 1 974 811 A1 | 10/2008 | |
| JP | 52-122293 A | 10/1977 | |
| JP | 57-127426 A | 8/1982 | |
| JP | 62-42744 A | 2/1987 | |
| JP | 02-229547 A | 9/1990 | |
| JP | 06-327944 A | 11/1994 | |
| JP | 2000-000471 A | 1/2000 | |
| JP | 2000000471 A * | 1/2000 | |
| JP | 2001-113167 A | 4/2001 | |
| JP | 2001113167 A * | 4/2001 | |
| JP | 2003-93881 A | 4/2003 | |
| JP | 2004-033991 A | 2/2004 | |
| JP | 2004-513771 A | 5/2004 | |
| JP | 2005-81189 A | 3/2005 | |
| JP | 2005-144299 A | 6/2005 | |
| JP | 2005-238195 A | 9/2005 | |
| JP | 2008-024565 A | 2/2008 | |
| RU | 2004 129 684 A | 3/2006 | |

OTHER PUBLICATIONS

Extended European Search Report Jul. 6, 2012, issued in corresponding European Patent Application No. 09848138.5 (6 pages).
Russian Office Action dated May 14, 2012, issued in corresponding Russian Application No. 2011103191, (10 pages). With English Translation.
Russian Decision to Grant dated Sep. 19, 2012, issued in corresponding Russian Patent Application No. 2011103191/04(004370), (14 pages). With English Translation.
Chinese Office Action dated Nov. 1, 2012, issued in corresponding Chinese Patent Application No. 200980130602.6, (20 pages). With English Translation.
Japanese Office Action dated Dec. 4, 2012, issued in corresponding Japanese Patent Application No. 2010-547913, (8 pages). With English Translation.
Internation Search Report of PCT/JP2009/067414, date of mailing Dec. 1, 2010.
Written Opinion of the International Searching Authority dated Dec. 1, 2010, issued in International Application No. PCT/JP2009/067414.
Office Action dated Nov. 25, 2013, issued on corresponding Korean application No. 10-2013-7023204, w/ English translation.
Canadian Office Action dated Oct. 25, 2013, issued in Canadian Patent Application No. 2729953 (3 pages).

* cited by examiner

*Primary Examiner* — Anthony J Zimmer
(74) *Attorney, Agent, or Firm* — Westerman, Hattori, Daniels & Adrian, LLP

(57) ABSTRACT

A NOx removal catalyst for high-temperature flue gas according to the present invention is a NOx removal catalyst for high-temperature flue gas that contains nitrogen oxide in which tungsten oxide with the number of molecular layers of tungsten oxide ($WO_3$) being five or less is supported on a complex oxide carrier containing titanium oxide. Even when high-temperature denitration is continued, a bonding force with a carrier of $WO_3$ can be properly maintained and volatilization can be suppressed while maintaining a high NOx removal performance. For example, the NOx removal catalyst is particularly suitable for reducing and removing nitrogen oxide contained in high-temperature gas discharged from a thermal power plant and a high-temperature boiler.

3 Claims, No Drawings

NOX REMOVAL CATALYST FOR HIGH-TEMPERATURE FLUE GAS, MANUFACTURING METHOD THEREOF, AND NOX REMOVAL METHOD FOR HIGH-TEMPERATURE FLUE GAS

FIELD

The present invention relates to a NOx removal catalyst for high-temperature flue gas, a manufacturing method thereof, and a NOx removal method for high-temperature flue gas, and more particularly relates to a NOx removal catalyst for high-temperature flue gas suitable for reducing and removing nitrogen oxide contained in high-temperature gas discharged from a thermal power plant, a gas turbine or the like.

BACKGROUND

High-temperature combustion flue gas discharged from a thermal power plant, a gas turbine or the like contains nitrogen oxide, and to discharge the flue gas, nitrogen oxide in flue gas needs to be removed. Therefore, NOx removal equipment is installed on a downstream side of a combustion engine, and a reducing agent is injected from an injection nozzle into combustion flue gas so that the reducing agent reductively reacts with nitrogen oxide (NO, $NO_2$), thereby decomposing combustion flue gas into harmless nitrogen ($N_2$) and water ($H_2O$). At the time of this operation, in a method of removing nitrogen oxide from flue gas by using a NOx removal catalyst, ammonia ($NH_3$), urea or the like is normally added thereto due to the necessity of causing a sufficient denitration reaction.

Conventionally, when nitrogen oxide in flue gas is decreased, ammonia is added thereto as a reducing agent, and when a NOx removal catalyst is used, processing is performed normally in a high-temperature region of 300° C. or higher. The denitration reaction makes progress according to following equation (1), and nitrogen oxide is decomposed into $N_2$ and $H_2O$ in a reaction between 1 mole of NO and 1 mole of $NH_3$.

$$4NH_3 + 4NO + O_2 \rightarrow 4N_2 + 6H_2O \tag{1}$$

However, in the conventionally used catalyst, when a temperature becomes as high as 450° C. or higher, an oxidation reaction of $NH_3$ itself makes progress according to following equation (2) or equation (3), other than the above equation (1).

$$2NH_3 + \tfrac{5}{2}O_2 \rightarrow 2NO + 3H_2O \tag{2}$$

$$4NH_3 + 3O_2 \rightarrow 2N_2 + 6H_2O \tag{3}$$

Due to the reaction according to the equation (2) or the equation (3), $NH_3$ is not effectively used for reduction of NO, and the NOx removal performance decreases with an increase of the temperature. Therefore, for example, when gas turbine outlet flue gas of 500° C. or higher is to be processed, the reducing agent is not sufficient, and thus application of a conventional reduction process accompanying ammonia addition has been difficult.

Meanwhile, as a removal method of nitrogen oxide at a high temperature, a technique of using titanium oxide containing heat-resistant inorganic fiber as a carrier has been reported (see Patent Literature 1).

CITATION LIST

Patent Literature

Patent Literature 1: Japanese Patent Application Laid-open No. H6-327944
Patent Literature 2: Japanese Patent Application Laid-open No. H2-229547

SUMMARY

Technical Problem

However, in a catalyst in which tungsten is simply supported as an active component on titanium oxide, which is a carrier, there is a limitation in catalyst activity even when optimization is made by the physical strength of inorganic fiber or the like, and it has been difficult to promote the denitration reaction efficiently.

Further, there has been a proposal of a carrier for a flue-gas processing catalyst formed of inorganic refractory oxide containing titanium-zirconium complex oxide having a crystal structure known as $ZrTiO_4$ (see Patent Literature 2). However, in an example showing the effect thereof, only NOx removal tests at 420° C. are shown, and there is no finding that it can be actually applicable to purification of flue gas at the gas turbine outlet temperature of 500° C. or higher, more preferably, 600° C. or higher.

Accordingly, there has been desired a development of a catalyst that can maintain a high-temperature NOx removal performance at 500° C. or higher for a long time by using a specific active metal, while suppressing a decrease in a specific surface area by using complex oxide as a catalyst carrier ($TiO_2$).

The present invention has been achieved in view of the above problems, and an object of the present invention is to provide a NOx removal catalyst for high-temperature flue gas that can maintain a NOx removal performance at a temperature as high as 500° C. or higher for a long time, a manufacturing method of the NOx removal catalyst, and a NOx removal method for high-temperature flue gas.

Solution to Problem

According to an aspect of the present invention, in an NOx removal catalyst for high-temperature flue gas containing nitrogen oxide, tungsten oxide is supported on a complex oxide carrier containing titanium oxide.

According to another aspect of the present invention, in a NOx removal catalyst for high-temperature flue gas containing nitrogen oxide, tungsten oxide with number of molecular layers of tungsten oxide ($WO_3$) being five or less is supported on a complex oxide carrier containing titanium oxide.

Advantageously, in the NOx removal catalyst for high-temperature flue gas, a support quantity of the $WO_3$ is equal to or more than 8% by weight in a weight ratio of entire catalyst.

Advantageously, in the NOx removal catalyst for high-temperature flue gas, complex oxide is complex oxide of a titanium compound complexed with either a zirconium compound or a silica compound.

Advantageously, in the NOx removal catalyst for high-temperature flue gas, sulfate radicals are caused to remain.

According to still another aspect of the present invention, a manufacturing method of a NOx removal catalyst for high-temperature flue gas, a substance containing either a zirconium compound or a silica compound and a titanium compound is fired at 500° C. to obtain a complex oxide carrier, and tungsten oxide is supported on the complex oxide carrier and fired at 650° C. to obtain a powdered catalyst.

Advantageously, in the manufacturing method of a NOx removal catalyst for high-temperature flue gas, sulfate radicals are caused to remain in the complex oxide carrier, and tungsten oxide is supported on the carrier in which sulfate radicals remain, and then fired.

According to still another aspect of the present invention, in a NOx removal method of high-temperature flue gas, flue gas at a temperature of 500° C. or higher is caused to circulate in the NOx removal catalyst for high-temperature flue gas according to any one of above, to decompose and remove nitrogen oxide in the flue gas.

Advantageous Effects of Invention

In the high-temperature NOx removal catalyst according to the present invention, $WO_3$ is supported on complex oxide, and by preferably setting the number of molecular layers of $WO_3$ to five or less, even when high-temperature denitration is continued, a bonding force with a carrier of $WO_3$ can be properly maintained and volatilization can be suppressed while maintaining a high NOx removal performance.

DESCRIPTION OF EMBODIMENTS

Exemplary embodiments and examples of the present invention will be explained below in detail. The present invention is not limited to the embodiments and examples. In addition, constituent elements in the following embodiments include those that can be easily assumed by persons skilled in the art or that are substantially equivalent.

A NOx removal catalyst for high-temperature flue gas according to the present invention contains nitrogen oxide, in which tungsten oxide ($WO_3$) is supported on a complex oxide carrier containing titanium oxide, and preferably, tungsten oxide having five or less molecular layers of $WO_3$ is supported thereon.

The complex oxide constituting the carrier is obtained by firing either a zirconium compound or a silica compound and a titanium compound at a high temperature.

In the present invention, tungsten oxide ($WO_3$) to be used as an active component is supported, and preferably, tungsten oxide ($WO_3$) having five or less molecular layers is supported.

The number of molecular layers indicates a thickness of the molecular layer of tungsten oxide ($WO_3$) formed on the catalyst carrier. Particularly, when high-temperature denitration is continued, a specific surface area of the catalyst carrier decreases, to increase the number of molecular layers, as described in Examples and Comparative examples described later, and thus there is such a tendency that a NOx removal efficiency decreases.

Further, "number of molecular layers of $WO_3$" described in the present invention is defined as follows.

"Number of molecular layers"="area of unimolecular layer of $WO_3$ (*1)" [$m^2$/100 g-catalyst]/specific surface area of catalyst [$m^2$/100 g-catalyst]

Regarding (*1), "area of unimolecular layer of $WO_3$" [$m^2$/100 g-catalyst]="number of moles of $WO_3$ in catalyst" [$m^{2/}$100 g-catalyst]/"number of moles of unimolecular layer of $WO_3$ (*2) [number of moles of mol/l $cm^2$]".

Regarding (*2), when it is assumed that a density of tungsten oxide is 7.16 [$g/cm^3$], a molecular weight thereof is 231.8 [g/mol], and an atomic radius of tungsten is 193 [pm], "number of moles of unimolecular layer of $WO_3$"=(7.16/231.8) [number of moles of tungsten oxide per 1 $cm^3$]×$193/10^{10}$ [pm is converted to cm]=$5.96e^{10}$.

A support quantity of tungsten oxide ($WO_3$) with respect to the entire catalyst is preferably 8% by weight or more in a weight ratio of the entire catalyst, and more preferably, 12% to 24% by weight.

This is because if the support quantity exceeds 24% by weight, a further effect of increase in weight of tungsten cannot be obtained, thereby causing a cost increase.

In the NOx removal catalyst for high-temperature flue gas according to the present invention, sulfate processing can be performed so that the reducing agent in an added amount can effectively exert its effects on the catalyst by suppressing decomposition of ammonia as a reducing agent up to a high temperature region by an increase in an acid amount or acid strength of the catalyst carrier.

The sulfate processing is a processing method in which complex oxide for the carrier is immersed, for example, in sulfuric acid and then dried, and the complex oxide is dried again in a heating furnace in a high temperature atmosphere (for example, 500° C. to 600° C.), so that sulfate radicals remain in the carrier component.

An example of a manufacturing method of the NOx removal catalyst for high-temperature flue gas according to the present invention is described below.

First, a substance containing either a zirconium compound or a silica compound and a titanium compound is fired at a temperature of 600° C. or lower (preferably, at a temperature of about 500° C.), to obtain a complex oxide carrier.

Next, tungsten oxide is supported on the complex oxide carrier and fired at a temperature substantially equal to an operating temperature, or at a temperature higher than the operating temperature by about 50° C. (for example, 650° C.), thereby obtaining a powdered catalyst.

The reason why tungsten oxide as the active component is supported and then fired at a temperature substantially equal to the operating temperature, or at a temperature higher than the operating temperature by about 50° C. is that a crack or the like in the catalyst can be prevented with respect to temperature changes, by firing tungsten oxide at a temperature substantially equal to the operating temperature.

As the method of manufacturing the complex oxide carrier, for example, any one of coprecipitation (CP) method, homogeneous precipitation (HP) method, and sol-gel method can be used.

An example of the coprecipitation method is described below. Titanium chloride ($TiCl_4$) aqueous solution and zirconium oxychloride aqueous solution were mixed in a predetermined ratio (for example, $TiO_2:ZrO_2$=90 to 50:10 to 50 (weight ratio). The temperature was set to a room temperature.

Ammonia aqueous solution was dropped into the mixed aqueous solution until pH became 7, to form coprecipitated slurry.

The slurry was stirred and matured for approximately a predetermined time, and then filtered and washed to obtain a cake. The obtained cake was dried at 110° C., fired for a predetermined time at a temperature equal to or lower than 600° C. (for example, 500° C.), thereby obtaining $TiO_2.ZrO_2$ complex oxide. The complex oxide was designated as complex oxide I.

Ammonium paratungstate was dissolved in methylamine aqueous solution so that $WO_3$ was in a predetermined amount (equal to or larger than 8 parts by weight) per 100 parts by weight of the complex oxide I, which was then dropped on powdered complex oxide, and kneading and drying were repeated so that tungsten oxide ($WO_3$) was supported thereon.

The carrier was fired for a predetermined time at a temperature substantially equal to the operating temperature (for example, 650° C.), thereby obtaining a powdered catalyst.

After an obtained powder was immobilized by a 30-ton compression molding machine, for example, the powder was pulverized so that particle diameters thereof were in a range of from 2 to 4 millimeters, for example, and then sieved to obtain a NOx removal catalyst for high-temperature flue gas.

According to the NOx removal catalyst for high-temperature flue gas of the present invention, as described in Examples described later, the number of molecular layers of $WO_3$ is preferably set to five or less and the support quantity of $WO_3$ is set to 8% by weight in a weight ratio of the entire catalyst. Therefore, even when high-temperature denitration is continued at a flue gas temperature of 500° C. or higher, a bonding force with a carrier of $WO_3$ can be properly maintained, and volatilization can be suppressed while maintaining a high NOx removal performance.

In the present invention, flue gas at a temperature of 500° C. or higher, preferably 600° C. or higher, is caused to circulate in the NOx removal catalyst for high-temperature flue gas, to decompose and remove nitrogen oxide in flue gas.

The shape of the NOx removal catalyst is not particularly limited, and for example, a honeycomb shape, a shape obtained by stacking the honeycomb shape, a shape obtained by filling a granular catalyst or the like can be used. Particularly, a catalyst having a honeycomb shape is preferable. The size of the honeycomb catalyst can be arbitrarily determined according to flue gas characteristics, flow rate or the like, and is not particularly limited. For example, an external shape of a flue gas inlet can be, for example, 10 to 150 millimeter square, and a length L thereof can be about 100 to 500 millimeters.

In a NOx removal process using the catalyst according to the present invention, nitrogen oxide can be removed according to the equation (1) described above by the NOx removal catalyst.

In a processing method of flue gas discharged from various combustion devices, discharged flue gas is delivered to a NOx removal catalyst for high-temperature flue gas and undergoes the NOx removal process, in which ammonia or urea is added thereto as a reducing agent on an upstream side of the NOx removal catalyst for high-temperature flue gas.

Flue gas that can be processed in the present invention is not particularly limited, and the present invention can be applied to processing of flue gas containing nitrogen oxide. The present invention is preferably used for processing of flue gas discharged from a boiler in a thermal power plant or a factory that burns fuel such as coal or heavy oil, or flue gas discharged from a heating furnace in a metal factory, an oil refinery, a petrochemical plant or the like, and in particular, the present invention is preferably used for processing of gas discharged from a thermal power plant and a gas turbine.

EXAMPLES

Examples that represent effects of the present invention are explained below; however, the present invention is not limited thereto.

Example 1

Tetraethyl orthotitanate ($Ti(OC_2H_5)_4$) aqueous solution and tetraethyl orthosilicate ($Si(OC_2H_5)_4$) aqueous solution were mixed in a weight ratio of $TiO_2:SiO_2=95:5$, and this mixed aqueous solution was heated to 80° C. The mixed aqueous solution was hydrolyzed for 2 or more hours, and an obtained product was filtered and washed to obtain a cake. The obtained cake was dried at 110° C., fired for 5 hours at 500° C., thereby obtaining $TiO_2.SiO_2$ complex oxide. The $TiO_2.SiO_2$ complex oxide was designated as the complex oxide I.

Ammonium paratungstate was dissolved in methylamine aqueous solution so that $WO_3$ was 16 parts by weight per 100 parts by weight of the complex oxide I, which was then dropped on powdered complex oxide, and kneading and drying were repeated so that tungsten oxide ($WO_3$) was supported thereon.

This carrier was fired for 3 hours at 650° C., thereby obtaining a powdered catalyst I.

After an obtained powder was immobilized by a 30-ton compression molding machine, the powder was pulverized so that particle diameters thereof were in a range of from 2 to 4 millimeters, and sieved to obtain a NOx removal catalyst I for high-temperature flue gas.

Example 2

Titanium chloride ($TiCl_4$) aqueous solution and zirconium oxychloride aqueous solution were mixed in a weight ratio of $TiO_2:ZrO_2=50:50$. The temperature was a room temperature.

Ammonia aqueous solution was dropped into the mixed aqueous solution until pH became 7, to form coprecipitated slurry.

The slurry was stirred and matured for 5 hours at 80° C., filtered and washed to obtain a cake. The obtained cake was dried at 110° C., fired for 5 hours at 500° C., thereby obtaining $TiO_2.ZrO_2$ complex oxide. The $TiO_2.ZrO_2$ complex oxide was designated as complex oxide II.

Ammonium paratungstate was dissolved in methylamine aqueous solution so that $WO_3$ was 16 parts by weight per 100 parts by weight of the complex oxide II, which was then dropped on powdered complex oxide, and kneading and drying were repeated so that tungsten oxide ($WO_3$) was supported thereon.

The carrier was fired for 3 hours at 650° C., thereby obtaining a powdered catalyst II.

After an obtained powder was immobilized by a 30-ton compression molding machine, the powder was pulverized so that particle diameters thereof were in a range of from 2 to 4 millimeters, and sieved to obtain a NOx removal catalyst II-1 for high-temperature flue gas.

Examples 3 and 4

The same operation was performed as in the Example 2 except that ammonium paratungstate was dissolved in methylamine aqueous solution so that $WO_3$ was 24 parts by weight and 12 parts by weight, respectively, per 100 parts by weight of the complex oxide II, to obtain NOx removal catalysts II-2 and II-3 for high-temperature flue gas, respectively.

Comparative Examples 1 and 2

16% by weight and 9.5% by weight of tungsten oxide ($WO_3$) were respectively supported on a titanium oxide carrier to obtain comparative catalysts 1 and 2 of Comparative examples 1 and 2.

Comparative Example 3

The same operation was performed as in the Example 1 except that ammonium paratungstate was dissolved in methylamine aqueous solution so that $WO_3$ was 8 parts by weight per 100 parts by weight of the complex oxide I, to obtain a comparative catalyst 3.

An intensity-ratio test method was performed by measuring an intensity ratio of Ti and W by using a X-ray fluorescence spectrometer. A shape of an analysis sample used for an evaluation test of NOx reduction activity was directly used.

A NOx removal efficiency test was performed by evaluating the NOx reduction activity under a condition shown in Table 2.

The NOx removal efficiency was obtained according to the following equation:

NOx removal efficiency(%)=[Inlet(NO+NO$_2$)−outlet (NO+NO$_2$)]×100/inlet(NO+NO$_2$).

Catalyst composition, WO$_3$/TiO$_2$ intensity ratio, number of molecular layers of WO$_3$, and the NOx removal efficiency are shown in Table 1.

Examples, there was no increase in the number of molecular layers of tungsten oxide (WO$_3$). However, in the Comparative example 1, there was an increase in the number of molecular layers of tungsten oxide (WO$_3$), and the NOx removal efficiency decreased.

Changes in an initial NOx removal efficiency with respect to changes of a flue gas temperature are shown in Table 3, using the catalyst II-1. When the flue gas temperature was increased from 500° C. to 600° C., a decrease in the efficiency of about 6% was observed.

TABLE 1

|  | Catalyst No. | Catalyst Composition | Specific surface area (m$^2$/g) | | WO$_3$/TiO$_2$ intensity ratio | | Number of molecular layers of WO$_3$ | | NOx removal efficiency (% @600° C.) | |
| --- | --- | --- | --- | --- | --- | --- | --- | --- | --- | --- |
|  |  |  | Initial stage | 800° C. × after 15 h | Initial stage | 800° C. × after 15 h | Initial stage | 800° C. × after 15 h | Initial stage | 800° C. × after 15 h |
| Example 1 | Catalyst I | 16 wt. % WO$_3$/TiO$_2$—SiO$_2$ | 114.4 | 36.2 | 1 | 0.53 | 1.2 | 3.8 | 79.0 | 61.4 |
| Example 2 | Catalyst II-1 | 16 wt. % WO$_3$/TiO$_2$—ZrO$_2$ | 91.0 | 48.2 | 1 | 0.70 | 1.5 | 2.9 | 76.7 | 64.0 |
| Example 3 | Catalyst II-2 | 24 wt. % WO$_3$/TiO$_2$—ZrO$_2$ | 65.1 | 46.3 | 1 | 0.70 | 3.5 | 4.9 | 73.4 | 60.1 |
| Example 4 | Catalyst II-3 | 12 wt. % WO$_3$/TiO$_2$—ZrO$_2$ | 77.0 | 41.8 | 1 | 0.70 | 1.2 | 2.4 | 70.7 | 60.0 |
| Comparative example 1 | Comparative Catalyst 1 | 16 wt. % WO$_3$/TiO$_2$ | 72.0 | 15.2 | 1 | 0.43 | 1.9 | 9.1 | 69.8 | 33.2 |
| Comparative example 2 | Comparative Catalyst 2 | 9.5 wt. % WO$_3$/TiO$_2$ | — | — | — | — | — | — | 62.2 | — |
| Comparative example 3 | Comparative Catalyst 3 | 8 wt. % WO$_3$/TiO$_2$—SiO$_2$ | — | — | — | — | — | — | 60.0 | — |

TABLE 2

| Catalyst temperature | 500° C., 550° C., 600° C., |
| --- | --- |
| Catalyst shape | Crushed item in pressure molding |
| Gas composition (Remnant: N$_2$) | NO$_x$: 54 ppm |
|  | O$_2$: 14 vol % (dry) |
|  | CO$_2$: 4.8 vol % (dry) |
|  | H$_2$O: 8.8 vol % (wet) |
|  | NH$_3$: 54 ppm |
| Gas flow rate | 220 liters N/h |

From the results shown in Table 1, in the catalysts I, II-1 to II-3 according to the Examples 1 to 4, any considerable decrease in the NOx removal efficiency was not observed in a high-temperature NOx removal efficiency test performed at 800° C. after a lapse of 15 hours (the flue gas temperature: 600° C.)

On the other hand, in the comparative catalyst 1, a considerable decrease in the NOx removal efficiency was observed in the high-temperature NOx removal efficiency test performed at 800° C. after a lapse of 15 hours (600° C.) In these

TABLE 3

| Catalyst No. | Catalyst composition | NOx removal efficiency (%) | | |
| --- | --- | --- | --- | --- |
|  |  | 500° C. | 550° C. | 600° C. |
| Catalyst II-1 | 16 wt. % WO$_3$/TiO$_2$—ZrO$_2$ | 82.8 | 81.8 | 76.7 |

Example 5

In the Example 2, complex oxide II-1 before firing was immersed in 100 milliliters of 1 mole percent sulfuric acid aqueous solution, dried, and then fired. Thereafter, WO$_3$ was supported thereon, evaporated to dryness, followed by firing for 3 hours at 650° C., thereby obtaining catalyst III, which had undergone sulfuric acid processing.

The catalyst composition, WO$_3$/TiO$_2$ intensity ratio, number of molecular layers of WO$_3$, and the NOx removal efficiency of the catalyst III are shown in Table 4. By performing sulfuric acid processing, high-temperature endurance was also improved. It can be considered that sulfate radicals infiltrated into complex oxide particles to suppress sintering.

TABLE 4

| Catalyst No. | Catalyst Composition | WO₃/TiO₂ intensity ratio | | Number of molecular layers of WO₃ | | NOx removal efficiency (% @600° C.) | |
|---|---|---|---|---|---|---|---|
| | | Initial stage | 800° C. × after 15 h | Initial stage | 800° C. × after 15 h | Initial stage | 800° C. × after 15 h |
| Catalyst III | 16 wt. % WO₃/ SO₄/TiO₂—ZrO₂ | 1 | 0.64 | 1.9 | 1.6 | 77.3 | 70.0 |

INDUSTRIAL APPLICABILITY

As described above, the NOx removal catalyst for high-temperature flue gas according to the present invention is particularly suitable for reducing and removing nitrogen oxide contained in high-temperature gas discharged from a thermal power plant and a high-temperature boiler, for example.

The invention claimed is:

1. A NOx removal catalyst for high-temperature flue gas having a temperature of equal to or higher than 500° C., the high-temperature flue gas containing nitrogen oxide, comprising:
   a complex oxide carrier which is a complex oxide of a titanium compound complexed with either a zirconium compound or a silica compound;
   tungsten oxide ($WO_3$) supported on the complex oxide carrier,
   wherein a support quantity of the $WO_3$ is 16% to 24% by weight of the entire catalyst and the $NO_X$ removal catalyst has a $NO_X$ removal efficiency between 73.4% and 79% at 600° C.

2. The NOx removal catalyst for high-temperature flue gas according to claim 1, wherein the complex oxide carrier further contains sulfate radicals.

3. A NOx removal method of high-temperature flue gas, wherein flue gas at a temperature of 500° C. or higher is caused to circulate in the NOx removal catalyst for high-temperature flue gas according to claim 1, to decompose and remove nitrogen oxide in the flue gas.

* * * * *